United States Patent

Ohno et al.

[11] Patent Number: 5,825,124
[45] Date of Patent: *Oct. 20, 1998

[54] CATHODE-RAY TUBE HAVING ACTIVATED GREEN AND BLUE PHOSPHORS

[75] Inventors: Katsutoshi Ohno, Tokyo; Tsuneo Kusunoki, Kanagawa; Kenji Takayanagi, Kanagawa; Masaru Ihara, Kanagawa, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 619,293

[22] Filed: Mar. 21, 1996

[30] Foreign Application Priority Data

Mar. 23, 1995 [JP] Japan .................................. 7-064416

[51] Int. Cl.⁶ .................................................... H01J 29/20
[52] U.S. Cl. ............................................ 313/467; 313/468
[58] Field of Search ...................................... 313/467, 468

[56] References Cited

U.S. PATENT DOCUMENTS

| | | | |
|---|---|---|---|
| 3,673,102 | 6/1972 | Lehmann et al. | 252/301.45 |
| 3,688,144 | 8/1972 | Harao et al. | 313/475 |
| 3,860,753 | 1/1975 | Tsuneta et al. | 313/475 X |
| 4,510,414 | 4/1985 | Fujino et al. | 313/468 |
| 4,772,818 | 9/1988 | Koike et al. | 313/468 X |
| 5,569,977 | 10/1996 | DonoFrio | 313/466 |

FOREIGN PATENT DOCUMENTS

| | | | |
|---|---|---|---|
| 156649 | 12/1981 | Japan | 313/467 |
| 156787 | 8/1985 | Japan | 313/467 |
| 199090 | 10/1985 | Japan | 313/467 |
| 199091 | 10/1985 | Japan | 313/467 |
| 199092 | 10/1985 | Japan | 313/467 |
| 161083 | 6/1989 | Japan | 313/467 |
| 860170 | 8/1981 | U.S.S.R. | 313/467 |

*Primary Examiner*—Michael Brock
*Assistant Examiner*—Daniel S. Larkin
*Attorney, Agent, or Firm*—Hill & Simpson

[57] ABSTRACT

A cathode-ray tube includes a phosphor screen having a tricolor phosphor layer composed of a red phosphor, a green phosphor of ZnS:Cu, Al activated with Ni, Fe, or Co, and a blue phosphor of ZnS:Ag activated with Ni, Fe, or Co. The green phosphor and the blue phosphor have a decay intensity of at most 0.5% upon elapse of 8 milliseconds after excitation is removed therefrom. The green phosphor of ZnS:Cu, Al activated with Ni and the blue phosphor of ZnS:Ag activated with Ni have their afterglow characteristics substantially equalized to the afterglow characteristics of the red phosphor of $Y_2O_2S$:Eu.

4 Claims, 4 Drawing Sheets

CATHODE-RAY TUBE HAVING ACTIVATED GREEN AND BLUE PHOSPHORS

BACKGROUND OF THE INVENTION

1. Field of the Invention

The present invention relates to a cathode-ray tube having a phosphor screen with improved green and blue phosphors.

2. Description of the Related Art

There has recently been developed a three-dimensional television system having a direct viewing display tube for displaying three-dimensional images based on the parallax of the right and left eyes of the viewer. For displaying three-dimensional images on the three-dimensional television system, two images to be viewed respectively by the right and left eyes of the viewer are produced by cameras, compressed vertically, and combined into a single image. The combined single image is then converted into a MUSE signal, which is recorded. The recorded MUSE signal is reproduced, supplied to a cathode-ray tube, and scanned at a vertical scanning frequency of 120 Hz, which is twice an ordinary vertical scanning frequency of 60 Hz, so as to be restored to its original size, for thereby alternately displaying images for the right and left eyes, each in 1/120 second.

For the viewer to see a three-dimensional image, the viewer wears three-dimensional glasses having liquid-crystal shutters for the right and left eyes, and the liquid-crystal shutters are alternately switched, each in 1/120 second, in timed relation to the image, i.e., the field period. The viewer can view a three-dimensional image free from flickering through the three-dimensional glasses.

In order to avoid undesirable flickering of a three-dimensional image displayed on the direct viewing cathode-ray tube of the three-dimensional television system, the vertical scanning frequency, i.e., the field frequency, of the cathode-ray tube is 120 Hz which is twice the vertical scanning frequency of an ordinary cathode-ray tube.

Therefore, since the period of each field is smaller, if the image for the left eye in a preceding field remains displayed on the cathode-ray tube due to the afterglow, i.e., decay, of the phosphors of the phosphor screen of the cathode-ray tube when the image for the right eye in a present field is being displayed on the cathode-ray tube, then the two images are simultaneously displayed on the cathode-ray tube.

On color cathode-ray tubes, there have been used phosphors in three colors, i.e., a red phosphor of $Y_2O_2S:Eu$, a green phosphor of Zns:Cu, Al and a blue phosphor of ZnS:Ag. Particularly, the green and blue phosphors emit a longer afterglow, i.e., decay, impairing the quality of images which are displayed.

FIGS. 1 and 2 of the accompanying drawings show afterglow curves of usual red, green, and blue phosphors of a color cathode-ray tube which were excited by an electron beam. FIG. 2 shows at enlarged scale the decay of the red, green, and blue phosphors. In FIG. 2, the curve I represents the afterglow curve of a red phosphor of $Y_2O_2S:Eu$, the curve II a green phosphor of Zns:Cu, Al, and the curve III a blue phosphor of ZnS:Ag.

Table 1 indicated below shows a time τ over which the afterglow is reduced to 1/000, an afterglow intensity 8 milliseconds after the excitation by the electron beam ceased, and an afterglow intensity 16 milliseconds after the excitation by the electron beam ceased. The afterglow intensity after elapse of 8 milliseconds corresponds to that of a three-dimensional television system, and the afterglow intensity after elapse of 16 milliseconds corresponds to that of an ordinary television system.

TABLE 1

| | τ (1/100) | 8 msec. | 16 msec. |
|---|---|---|---|
| Red: $Y_2O_2S:Eu$ | 1.9 msec. | 0.25% | 0% |
| Green: Zns: Cu, Al | 7.5 msec. | 0.95% | 0.6% |
| Blue: ZnS: Ag | 7.0 msec. | 0.9% | 0.5% |

It can be seen from Table 1 that the green and blue phosphors have afterglow times longer than the red phosphor. In order to avoid a reduction in the quality of displayed images, cathode-ray tubes are designed to meet such a requirement that the afterglow intensity after excitation be at most 0.5% of the maximum afterglow intensity peak. For the three-dimensional television system (with the vertical scanning frequency of 120 Hz), as shown in Table 1, the afterglow intensities of the green and blue phosphors after elapse of 8 milliseconds are 0.95% and 0.9%, respectively. Therefore, the green and blue phosphors of the cathode-ray tube of the three-dimensional television system produce such afterglow intensities that impair the quality of displayed images.

SUMMARY OF THE INVENTION

It is therefore an object of the present invention to provide a cathode-ray tube including a phosphor screen which comprise phosphors in three colors that have uniform afterglow characteristics even if the field frequency of the cathode-ray tube is three times the field frequency of an ordinary cathode-ray tube.

According to the present invention, there is provided a phosphor layer for a phosphor screen of a cathode-ray tube, comprising a red phosphor, a green phosphor having a host material of ZnS:Cu, Al and an activator for the green phosphor selected from the group consisting of Ni, Fe, Co in an amount of at most 10 ppm relative to the host material, and a blue phosphor having a host material of ZnS:Ag and an activator for the blue phosphor selected from the group consisting of Ni, Fe, Co in an amount of at most 10 ppm relative to the host material.

According to the present invention, there is also provided a cathode-ray tube including a phosphor screen which has a phosphor layer comprising a red phosphor, a green phosphor having a host material of ZnS:Cu, Al and an activator for the green phosphor selected from the group consisting of Ni, Fe, Co in an amount of at most 10 ppm relative to the host material, and a blue phosphor having a host material of ZnS:Ag and an activator for the blue phosphor selected from the group consisting of Ni, Fe, Co in an amount of at most 10 ppm relative to the host material.

Each of the activator for the green phosphor and the activator for the blue phosphor is present in an amount ranging from 2 to 10 ppm.

The green phosphor and the blue phosphor have a decay intensity of at most 0.5% upon elapse of 8 milliseconds after excitation is removed therefrom.

The green phosphor of ZnS:Cu, Al activated with Ni and the blue phosphor of ZnS:Ag activated with Ni have their afterglow characteristics substantially equalized to the afterglow characteristics of the red phosphor of $Y_2O_2S:Eu$. Therefore, if these red, green, and blue phosphors are coated on the phosphor screen of the cathode-ray tube of a three-dimensional television system having a vertical scanning frequency of 120 Hz, then the cathode-ray tube is free of images which would otherwise be displayed due to persistence and can display images of good quality.

DETAILED DESCRIPTION OF THE PREFERRED EMBODIMENT

Cathode-ray tubes having a field frequency, i.e., a vertical scanning frequency, of 120 Hz, which is twice the field frequency of ordinary cathode-ray tubes, includes a phosphor screen having a tricolor phosphor layer composed of phosphors in three colors, i.e., a red phosphor of $Y_2O_2S:Eu$, a green phosphor of Zns:Cu, Al, and a blue phosphor of ZnS:Ag. Particularly, the green and blue phosphors emit longer afterglow, i.e., decay, than the red phosphor. Therefore, the colors of an image that remains displayed due to the persistence characteristic of the phosphor screen are governed by the colors of the afterglow of the green and blue phosphors. Since the human eyes are highly sensitive to differences in color, it is necessary to lower the afterglow, i.e., decay, intensities of the three phosphors and also equalize the afterglow intensities to each other, so that the colors of the image displayed by the afterglow will remain unchanged. At the same time, any reduction in the luminance of the phosphors should be avoided as much as possible.

The phosphor screen of a cathode-ray tube according to the present invention comprises a green phosphor of ZnS:Cu, Al activated with Ni, a blue phosphor of ZnS:Ag activated with Ni, and a red phosphor of $Y_2O_2S:Eu$.

Results of improved afterglow, i.e., improved decay, of green phosphors of ZnS:Cu, Al activated with Ni and blue phosphors of ZnS:Ag activated with Ni will be described below.

Figure 1:
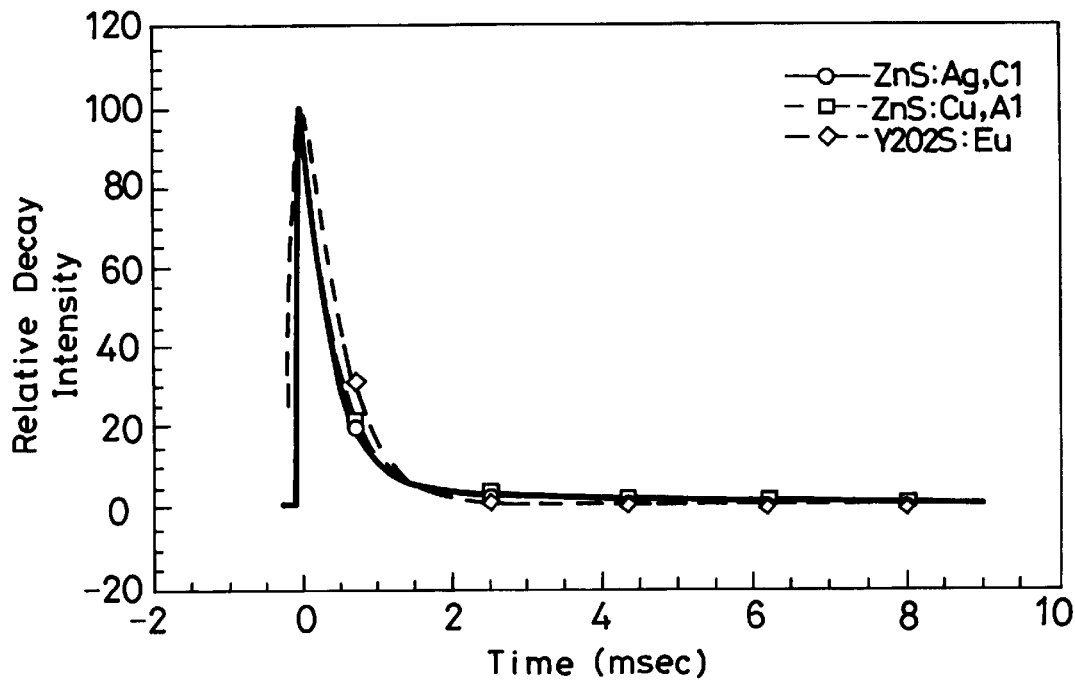
FIG. 1 is a graph of afterglow curves of phosphors in three colors of the phosphor screen of a cathode-ray tube.
Figure 2:
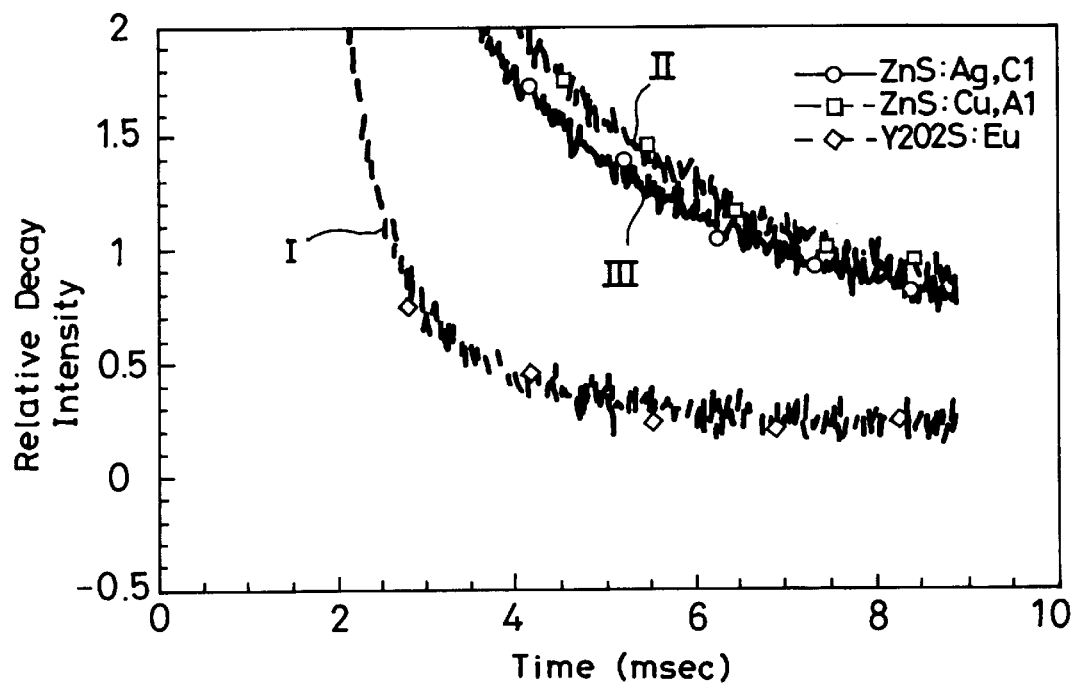
FIG. 2 is a graph showing at enlarged scale of the afterglow curves shown in FIG. 1.
Figure 3:
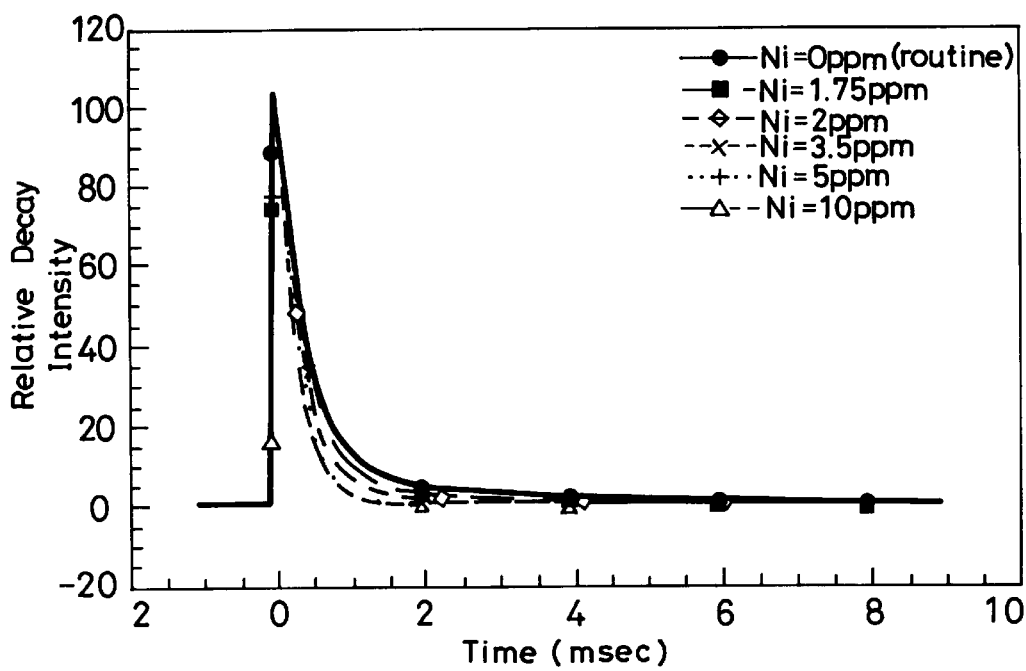
FIG. 3 is a graph of afterglow curves of green phosphors of ZnS:Cu, Al activated with Ni.
Figure 4:
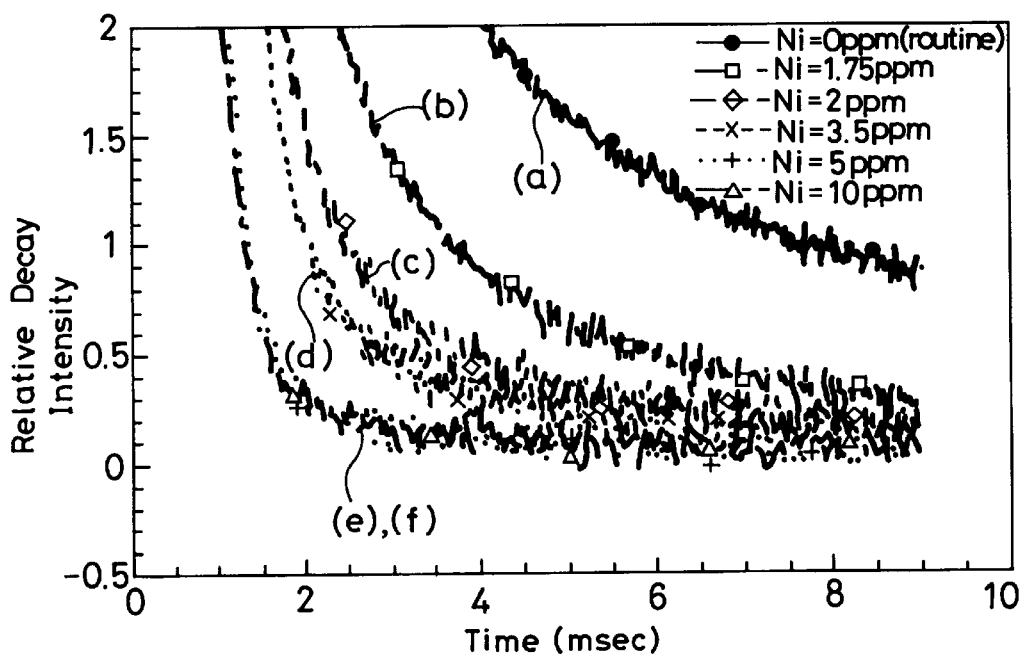
FIG. 4 is a graph showing at enlarged scale of the afterglow curves shown in FIG. 3.

FIG. 3 shows afterglow curves of green phosphors of ZnS:Cu, Al activated with Ni, and FIG. 4 shows an enlarged scale the afterglow curves shown in FIG. 3. The curves marked with ● in FIGS. 3 and 4 and indicated by (a) in FIG. 4 is an afterglow curve of a green phosphor of ZnS:Cu, Al activated with 0 ppm of Ni. The curves marked with ■ in FIGS. 3 and 4 and indicated by (b) in FIG. 4 is an afterglow curve of a green phosphor of ZnS:Cu, Al activated with 1.75 ppm of Ni. The curves marked with ◊ in FIGS. 3 and 4 and indicated by (c) in FIG. 4 is an afterglow curve of a green phosphor of ZnS:Cu, Al activated with 2.0 ppm of Ni. The curves marked with X in FIGS. 3 and 4 and indicated by (d) in FIG. 4 is an afterglow curve of a green phosphor of ZnS:Cu, Al activated with 3.5 ppm of Ni. The curves marked with + in FIGS. 3 and 4 and indicated by (e) in FIG. 4 is an afterglow curve of a green phosphor of ZnS:Cu, Al activated with 5 ppm of Ni. The curves marked with δ in FIGS. 3 and 4 and indicated by (f) in FIG. 4 is an afterglow curve of a green phosphor of ZnS:Cu, Al activated with 10 ppm of Ni. The curves (e), (f) overlap each other substantially fully along their entire lengths.

It can be seen from the curves shown in FIGS. 3 and 4 that the afterglow, i.e., decay, of the green phosphor of ZnS:Cu, Al is reduced as the amount of activating Ni is increased.

Table 2 shown below indicates relative luminances, chromaticities, and relative decay intensities 8 milliseconds after removal of excitation, of green phosphors of ZnS:Cu, Al activated with different amounts of Ni.

TABLE 2

| Amount of added Ni | Relative luminance | Chromaticity | | Relative decay intensity after 8 msec. |
|---|---|---|---|---|
| (ppm) | (%) | X | Y | (%) |
| 0 | 100 | 0.282 | 0.623 | 0.966 |
| 1.75 | 93 | 0.282 | 0.621 | 0.553 |
| 2 | 90 | 0.281 | 0.608 | 0.220 |
| 3.5 | 78 | 0.283 | 0.622 | 0.162 |
| 5 | 67 | 0.283 | 0.605 | 0.071 |
| 10 | 43 | 0.281 | 0.611 | 0.072 |

Figure 5:
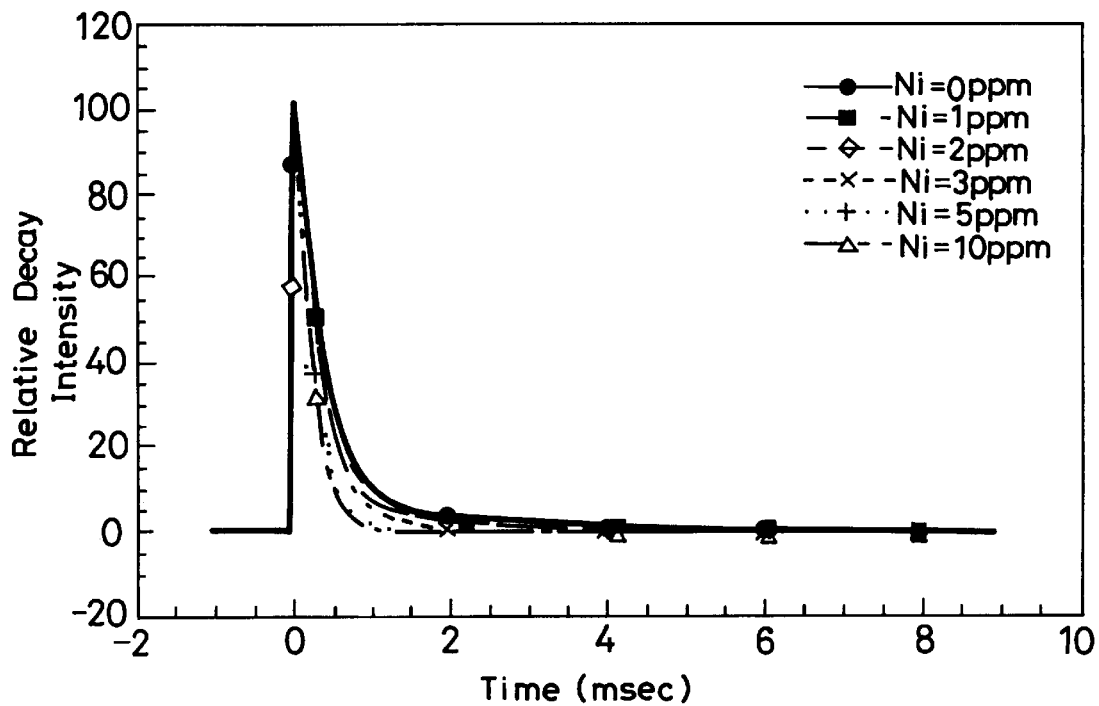
FIG. 5 is a graph of afterglow curves of blue phosphors of ZnS:Ag activated with Ni.
Figure 6:
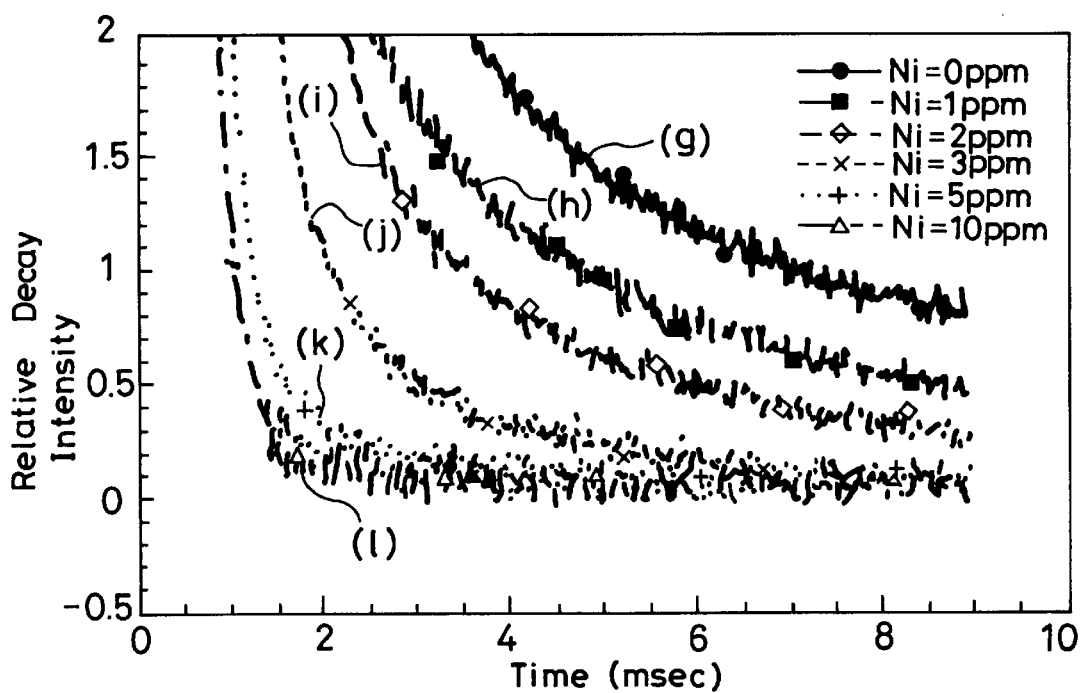
FIG. 6 is a graph showing at enlarged scale of the afterglow curves shown in FIG. 5.

FIG. 5 shows afterglow curves of blue phosphors of ZnS:Ag activated with Ni, and FIG. 6 shows an enlarged scale the afterglow curves shown in FIG. 5. The curves marked with ● in FIGS. 5 and 6 and indicated by (g) in FIG. 6 is an afterglow curve of a blue phosphor of ZnS:Ag activated with 0 ppm of Ni. The curves marked with ■ in FIGS. 5 and 6 and indicated by (h) in FIG. 6 is an afterglow curve of a blue phosphor of ZnS:Ag activated with 1 ppm of Ni. The curves marked with ◊ in FIGS. 5 and 6 and indicated by (i) in FIG. 6 is an afterglow curve of a blue phosphor of ZnS:Ag activated with 2 ppm of Ni. The curves marked with X in FIGS. 5 and 6 and indicated by (j) in FIG. 6 is an afterglow curve of a blue phosphor of ZnS:Ag activated with 3 ppm of Ni. The curves marked with + in FIGS. 5 and 6 and indicated by (k) in FIG. 6 is an afterglow curve of a blue phosphor of ZnS:Ag activated with 5 ppm of Ni. The curves marked with δ in FIGS. 5 and 6 and indicated by (l) in FIG. 6 is an afterglow curve of a blue phosphor of ZnS:Ag activated with 10 ppm of Ni. The curves (k), (l) overlap each other substantially fully along their entire lengths.

It can be seen from the curves shown in FIGS. 5 and 6 that the afterglow, i.e., decay, of the blue phosphor of ZnS:Ag is reduced as the amount of activating Ni is increased.

Table 3 shown below indicates relative luminances, chromaticities, and relative decay intensities 8 milliseconds after removal of excitation, of blue phosphors of ZnS:Ag activated with different amounts of Ni.

TABLE 3

| Amount of added Ni | Relative luminance | Chromaticity | | Relative decay intensity after 8 msec. |
|---|---|---|---|---|
| (ppm) | (%) | X | Y | (%) |
| 0 | 100 | 0.147 | 0.057 | 0.885 |
| 1 | 91 | 0.147 | 0.055 | 0.541 |
| 2 | 86 | 0.147 | 0.054 | 0.295 |
| 3 | 70 | 0.147 | 0.054 | 0.100 |

TABLE 3-continued

| Amount of added Ni (ppm) | Relative luminance (%) | Chromaticity | | Relative decay intensity after 8 msec. (%) |
| --- | --- | --- | --- | --- |
| | | X | Y | |
| 5 | 56 | 0.147 | 0.054 | 0.060 |
| 10 | 39 | 0.147 | 0.053 | 0.052 |

Figure 7:
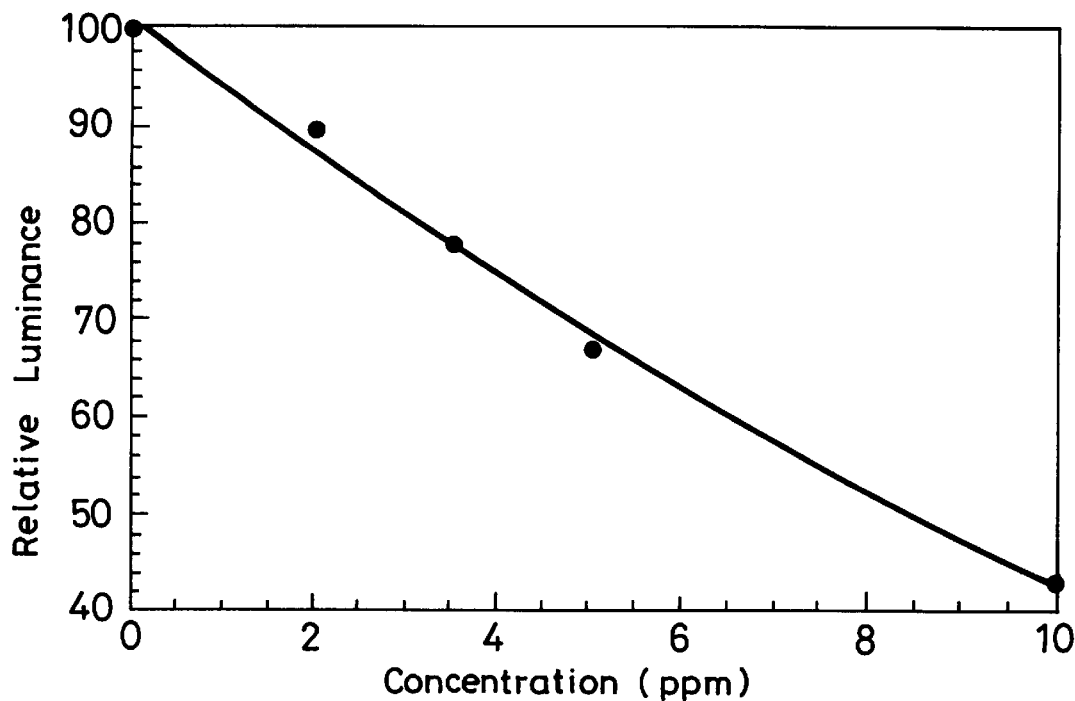
FIG. 7 is a graph showing how the luminance varies with the concentration of Ni added to the green phosphor of ZnS:Cu, Al.
Figure 8:
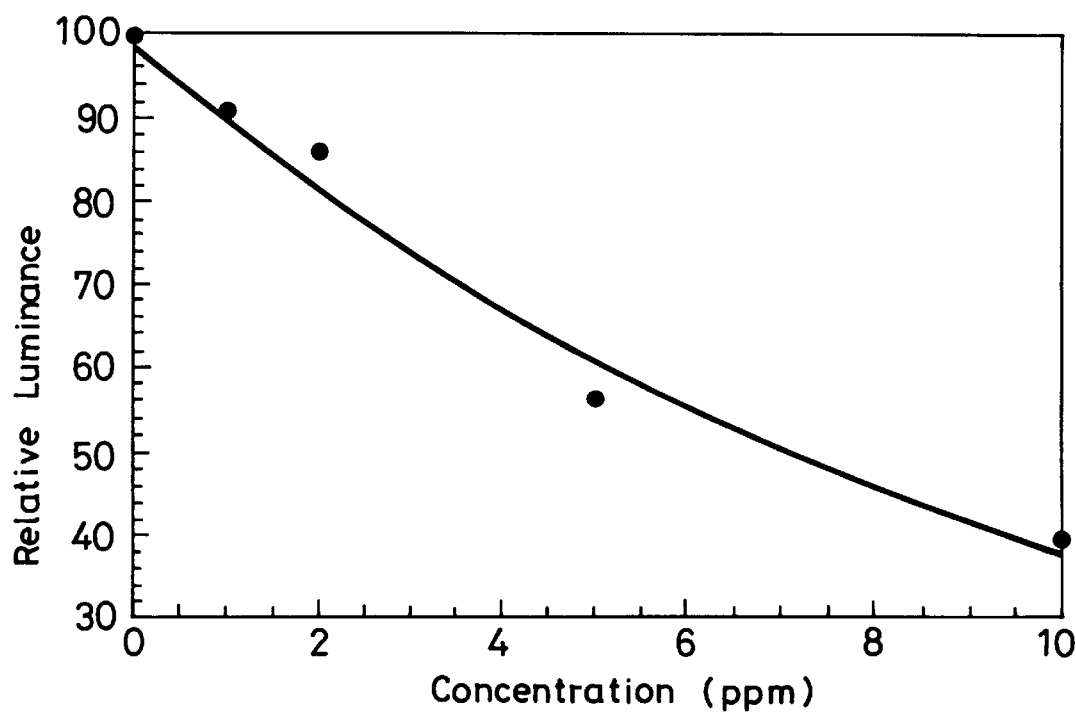
FIG. 8 is a graph showing how the luminance varies with the concentration of Ni added to the blue phosphor of ZnS:Ag.

FIG. 7 shows how the luminance of the green phosphor of ZnS:Cu, Al varies with the concentration of Ni added thereto based on Table 2, and FIG. 8 shows how the luminance of the blue phosphor of ZnS:Ag varies with the concentration of Ni added thereto based on Table 3.

The green phosphors of ZnS:Cu, Al activated with Ni have their chromaticities remaining substantially unchanged. When at least 2 ppm of Ni is added to ZnS:Cu, Al, the relative decay intensity of the green phosphor 8 milliseconds after excitation is removed is reduced to 0.5% or below. When 2 ppm of Ni is added to ZnS:Cu, Al, any reduction in the relative luminance is reduced by about 10%.

The blue phosphors of ZnS:Ag activated with Ni also have their chromaticities remaining substantially unchanged. When at least 2 ppm of Ni is added to ZnS:Ag, the relative decay intensity of the green phosphor 8 milliseconds after excitation is removed is reduced to 0.5% or below. When 2 ppm of Ni is added to ZnS:Ag, any reduction in the relative luminance is also reduced by about 10%.

In view of the relative luminance, the concentration of Ni added to ZnS:Cu, Al and ZnS:Ag should preferably be at most 10 ppm.

The green phosphor of ZnS:Cu, Al activated with Ni and the blue phosphor of ZnS:Ag activated with Ni have their afterglow characteristics substantially equalized to the afterglow characteristics of the red phosphor of $Y_2O_2S$:Eu. Therefore, if these red, green, and blue phosphors are mounted on the phosphor screen of a cathode-ray tube of a three-dimensional television system having a vertical scanning frequency of 120 Hz, then the cathode-ray tube is free of images which would otherwise be displayed due to persistence and has increased resolution.

A cathode-ray tube was produced with its phosphor screen having a green phosphor of ZnS:Cu, Al with 2 ppm of Ni added, a blue phosphor of ZnS:Ag with 2 ppm of Ni added, and a red phosphor of $Y_2O_2S$:Eu. The cathode-ray tube thus manufactured suffered at most a reduction of 10% or less of white luminance, and exhibited brightness comparable to equivalent ordinary cathode-ray tubes in an organoleptic test.

In the illustrated embodiment, ZnS:Cu, Al and ZnS:Ag are activated with Ni. However, ZnS:Cu, Al and ZnS:Ag may be activated with Fe or Co, added in the same amount as Ni, for improving their afterglow characteristics.

As with Ni, in view of the relative luminance, the concentration of Fe or Co added to ZnS:Cu, Al and ZnS:Ag should preferably be at most 10 ppm.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A three-dimensional television system, comprising:

a first camera for producing a first image for viewing by a left eye of a viewer;

a second camera for producing a second image for viewing by a right eye of the viewer, wherein the first and second images are vertically compressed and combined into a single transmission image;

a direct viewing cathode-ray/display tube having a vertical scanning frequency of 120 Hz by which a phosphor screen of the display tube receives the transmission signal; and a phosphor layer for the phosphor screen of the display tube, the phosphor layer comprising a red phosphor of $Y_2O_2S$:EU, having a decay intensity of at most 0.5% upon elapse of 8 milliseconds after excitation is removed therefrom; a green phosphor having a host material of ZnS:Cu, Al, and having a decay intensity substantially equal to said decay intensity of said red phosphor; and a blue phosphor having a host material of ZnS:Ag, and having a decay intensity substantially equal to said decay intensity of said red phosphor.

2. A three-dimensional television system as claimed in claim 1, wherein said green phosphor includes a green phosphor activator selected from the group consisting of Ni, Fe, Co, and said blue phosphor includes a blue phosphor activator select from the group consisting of Ni, Fe, Co.

3. A three-dimensional television system as claimed in claim 2, wherein said green phosphor activator is present in an amount of at most 10 ppm relative to said green phosphor host material, and wherein said blue phosphor activator is present in an amount of at most 10 ppm relative to said blue phosphor host material.

4. A three-dimensional television system as claimed in claim 3, wherein said green phosphor activator is present in an amount ranging from 2 to 10 ppm relative to said green phosphor host material, and wherein said blue phosphor activator is present in an amount ranging from 2 to 10 ppm relative to said blue phosphor host material.

* * * * *